(12) United States Patent
Wang et al.

(10) Patent No.: US 10,267,707 B2
(45) Date of Patent: Apr. 23, 2019

(54) ROTATABLE FIXTURE

(71) Applicant: Institute of Nuclear Energy Research, Atomic Energy Council, Executive Yuan, R.O.C, Taoyuan (TW)

(72) Inventors: Tsu-Jen Wang, Taoyuan (TW); Wei-Fang Chang, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 0 days.

(21) Appl. No.: 15/697,865

(22) Filed: Sep. 7, 2017

(65) Prior Publication Data

US 2018/0156690 A1 Jun. 7, 2018

(30) Foreign Application Priority Data

Dec. 5, 2016 (TW) .............................. 105140122 A

(51) Int. Cl.
*G01M 7/02* (2006.01)
*G01M 7/06* (2006.01)
G21C 17/00 (2006.01)

(52) U.S. Cl.
CPC .............. *G01M 7/06* (2013.01); *G01M 7/027* (2013.01); *G21C 17/001* (2013.01)

(58) Field of Classification Search
CPC .......... G01M 7/00; G01M 7/02; G01M 7/022; G01M 7/027; G01M 7/04; G01M 7/06; G01M 7/08; F16C 11/06; G21C 17/001

USPC .................................. 73/663, 665–667, 672
See application file for complete search history.

(56) References Cited

U.S. PATENT DOCUMENTS

| | | | | |
|---|---|---|---|---|
| 5,083,463 | A * | 1/1992 | Marshall ................. | G01M 7/06 73/663 |
| 5,187,982 | A * | 2/1993 | Chu .......................... | B06B 1/14 73/666 |
| 5,445,030 | A * | 8/1995 | Hagen ..................... | G01M 7/06 73/662 |
| 6,062,086 | A * | 5/2000 | Hess ........................ | B06B 3/02 73/663 |
| 7,464,597 | B1 * | 12/2008 | Lee .......................... | B06B 3/00 73/663 |

(Continued)

*Primary Examiner* — Lisa M Caputo
*Assistant Examiner* — Suman K Nath
(74) *Attorney, Agent, or Firm* — Locke Lord LLP; Tim Tingkang Xia, Esq.

(57) ABSTRACT

A rotatable fixture for use in a vibration or seismic test is capable of shortening the time for dismantling the fixture. The rotatable fixture of the present invention is aimed to obviate the non-universalness of the conventional fixture and remove the drawbacks that the conventional fixture has to be dismantled before rotating to a certain angle for test. The rotatable fixture of the present invention includes a base, a rotating disc, a fastening frame, and fixing plates. The rotatable fixture has a basic natural frequency which is distant from the test frequency band. Meanwhile, the drawbacks that the fixture has to be dismantled during the test process is eliminated by the special connection between the base and the rotating disc. Moreover, due to the versatile design of the fastening frame, the rotatable fixture can allow a variety of devices under test to be secured thereto to attain universalness.

9 Claims, 7 Drawing Sheets

(56) References Cited

U.S. PATENT DOCUMENTS

2013/0042691 A1\* 2/2013 Hanse .................. G01M 7/027
　　　　　　　　　　　　　　　　　　　　　　73/663
2014/0057245 A1\* 2/2014 Martinez ............... G01M 7/027
　　　　　　　　　　　　　　　　　　　　　　434/375

\* cited by examiner

ROTATABLE FIXTURE

CROSS-REFERENCE TO RELATED PATENT APPLICATION

This application claims the benefit of Taiwan Patent Application No. 105140122, filed on Dec. 5, 2016, in the Taiwan Intellectual Property Office, the disclosure of which is incorporated herein in its entirety by reference.

BACKGROUND OF THE INVENTION

Field of the Invention

The present invention is related to a fixture for use in test of shake table to fasten a device, and more particularly to a self-rotating universal fixture for fastening a device under test.

Description of the Prior Art

To ensure the safe operation of nuclear power plants, relevant equipments used in nuclear power plants are designed to sustain structural integrity and maintain its safety function during and after earthquake. In order to achieve this goal, quality of the equipment is granted through seismic qualification test, and a shake table is used for performing seismic qualification test. Generally speaking, during the seismic qualification test, the device under test (the structure of equipment) has to be mounted on a fixture, then the fixture is fastened to the test platform of the shake table to perform the test. In order to make the test results accurate, the fixture must possess considerable stiffness and rigidness without introducing unwanted amplification effect. Also the fixture must avoid producing resonance within the test frequency range.

Generally speaking, the fixture used in seismic test has to be designed according to the size, weight, and mounting measure in the field of the device. Therefore, each device under test is collocated with a dedicated fixture, and this is the necessary cost of the test. If there is a universal fixture that can be reused with most kinds of device, the cost of test can be reduced. Moreover, when a tri-axial shake table is not available, and a bi-axial or single-axial shake table is to be used in order to comply the test standard/specification, the fixture has to dismantled from the test platform first and rotates together with the device under test by 90 degree, and then fasten the fixture and the device to the test platform again so as to perform test for other axes. This process is very time-consuming and toilsome.

As a result, there is a motive to develop a universal and versatile self-rotating fixture for reducing the time consumed and cost incurred in the seismic test.

SUMMARY OF THE INVENTION

An object of the present invention is to provide a rotatable fixture for substantially tackling with the drawbacks encountered by the prior art. The rotatable fixture of the present invention can be applied to a small-sized device under test (especially a device weighs less than 10 kilograms). Also, the rotatable fixture of the present invention does not resonate within the frequency band of the seismic test and can rotate by itself with a simple mechanism. Thus, the rotatable fixture of the present invention can significantly reduce the time and cost incurred by the seismic test, and can eliminate the safety issues arising from the hoist, dismantlement, and rotation of the fixture.

For the object mentioned above, the present invention provides a rotatable fixture, which includes a base, a rotating disc, a fastening frame, and at least one fixing plate. The base is set to be securely mounted on the test platform of a shake table. The rotating disc is pivotally connected to the base through a central axle and is able to rotate with respect to the base by at least four rolling steel ball assembly. The fastening frame is uprightly fastened to the rotating disc, and the fixing plate is used to allow a device under test to be secured thereto. By way of at least one fastening member that can movably pass through the rotating disc and the fastening holes of the base, the rotating disc is fastened and the rotation of the rotating disc with respect to the base is limited. When the fastening member is removed, the rotating disc, the fastening frame, and the device under test mounted thereon can be rotated together to a certain angle (e.g. 90 degree) for the next test procedure. In this way, the test procedure that requires the fixture to be hoisted and dismantled from the test platform of the shake table and rotate by a certain degree can be eliminated.

Furthermore, the fastening frame is formed of a H-shaped steel plate that is configured as a hollow rectangle. The overall structural design of the fixture of the present invention makes its basic natural frequency to be larger than 33 Hz. Thus, resonance will not occur during the seismic test. Moreover, the fastening frame is configured to secure the device under test by the fixing plates and thus is applicable to all kinds of small-sized device.

Now the foregoing and other features and advantages of the present invention will be best understood through the following descriptions with reference to the accompanying drawings, in which:

DESCRIPTION OF THE PREFERRED EMBODIMENTS

Figure 1:
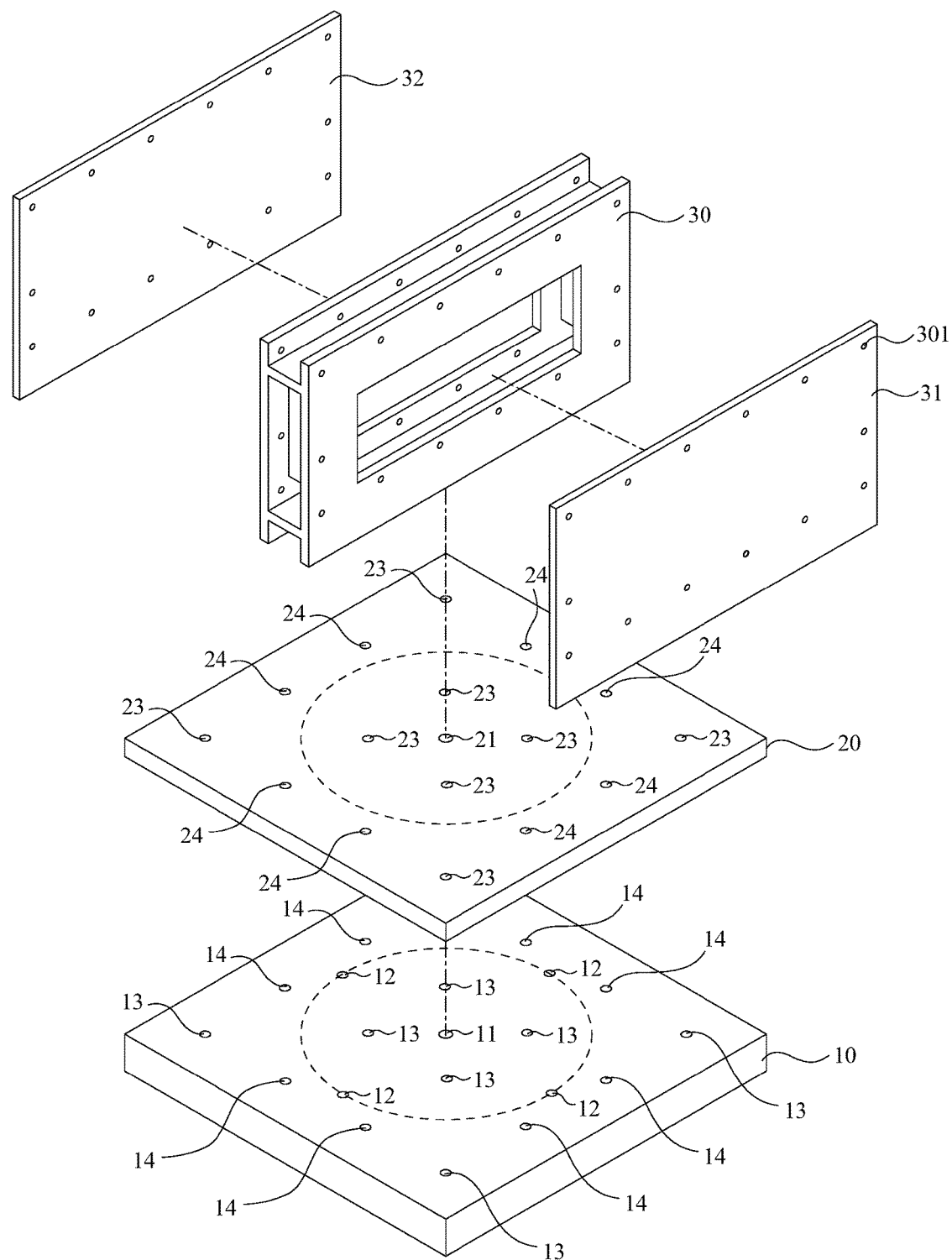
FIG. 1 shows a perspective exploded view of a rotatable fixture according to a preferred embodiment of the present invention.
Figure 2:
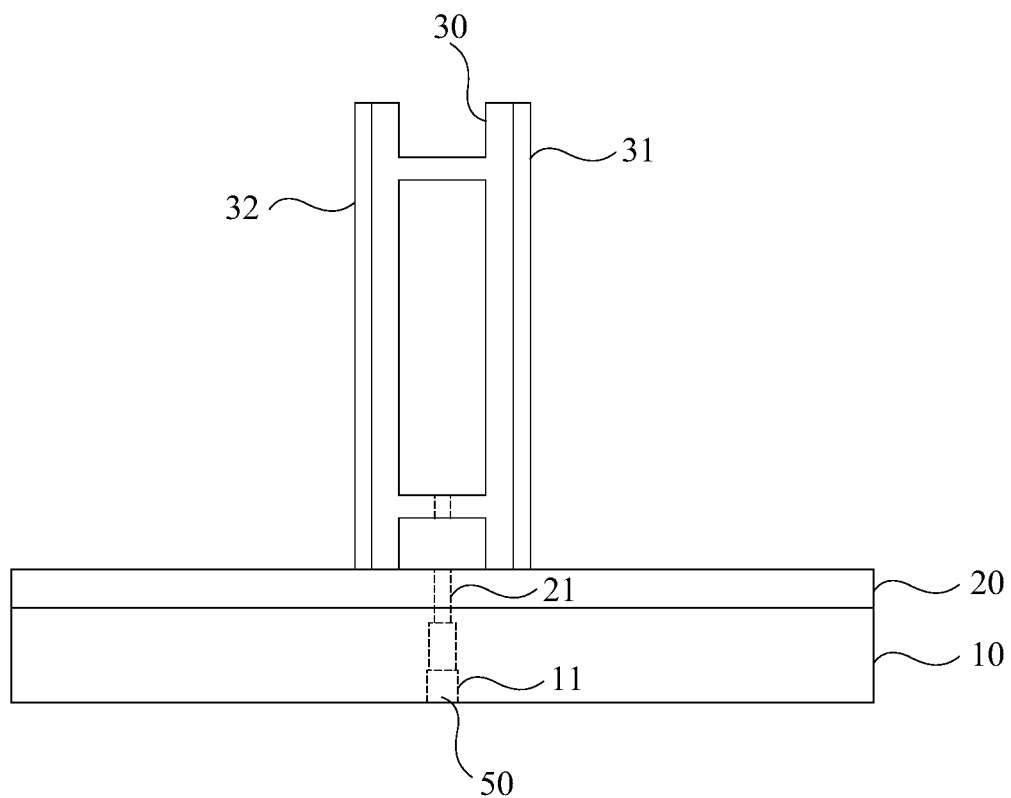
FIG. 2 shows an assembly side view of a rotatable fixture according to a preferred embodiment of the present invention.
Figure 3A:
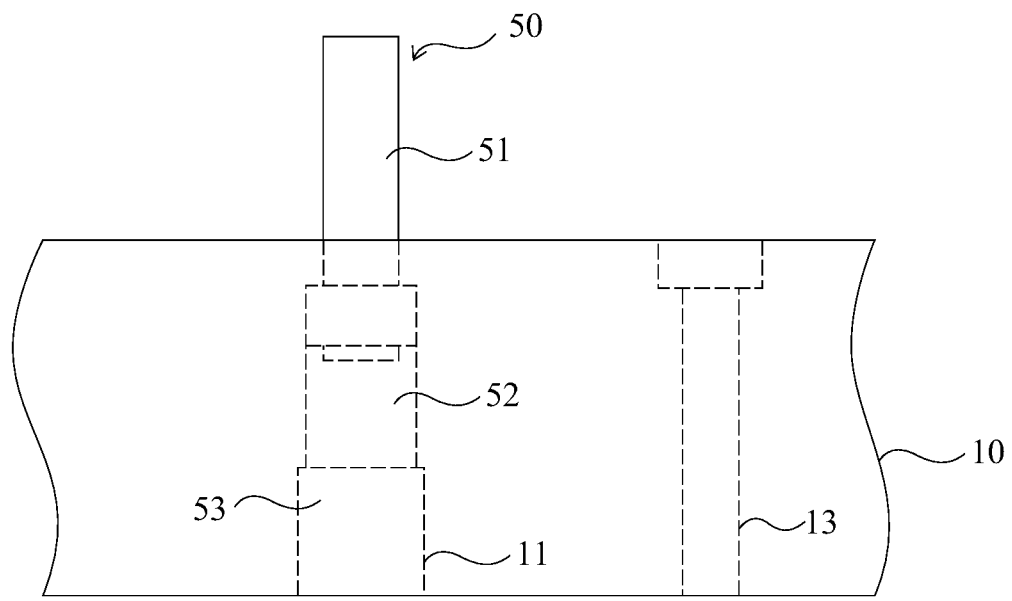
FIG. 3A shows a schematic view of a central axle of a rotatable fixture according to a preferred embodiment of the present invention.
Figure 3B:
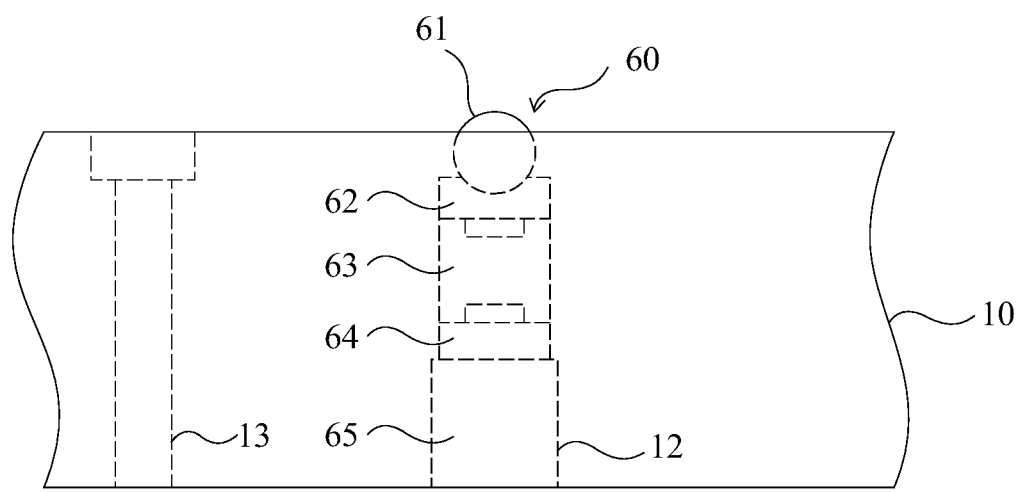
FIG. 3B a schematic view of a rolling steel ball assembly of a rotatable fixture according to a preferred embodiment of the present invention.
Figure 4A:
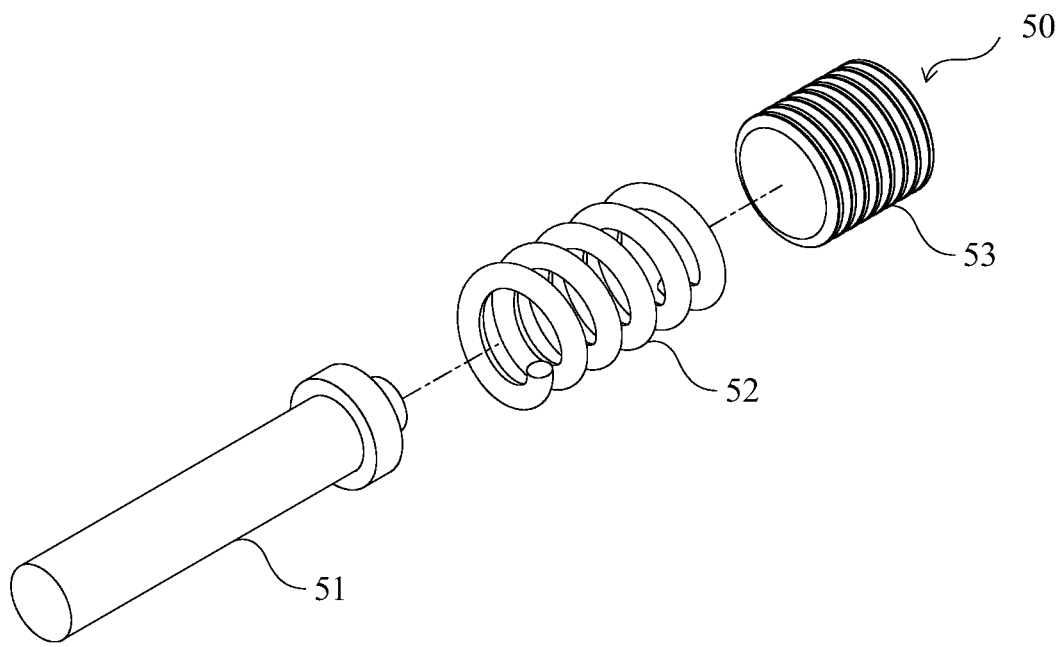
FIG. 4A shows an exploded view of a central axle of a rotatable fixture according to a preferred embodiment of the present invention.
Figure 4B:
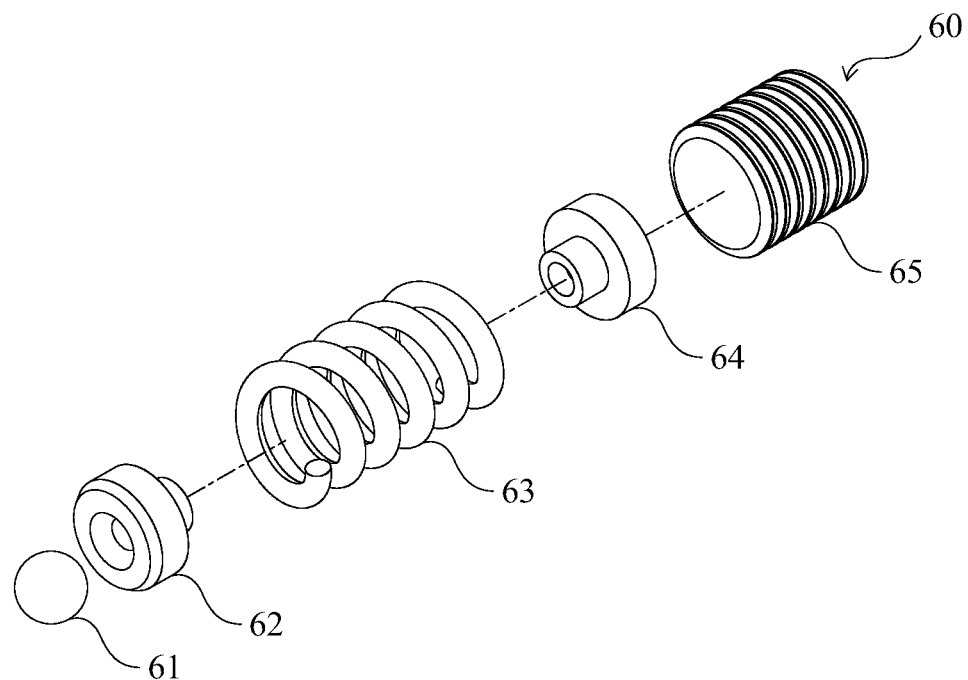
FIG. 4B shows an exploded view of a rolling steel ball assembly of a rotatable fixture according to a preferred embodiment of the present invention.

Referring to FIG. 1, a perspective exploded view of a rotatable fixture according to a preferred embodiment of the present invention is shown. The rotatable fixture includes a base 10, a rotating disc 20, a fastening frame 30, and a pair of fixing plates 31, 32. The base 10 is shaped as a plate having a plurality of perforations thereon. The perforation 11 located in the center of the base 10 is set to allow a central axle 50 to be installed therein and past therethrough. Referring to FIG. 3A and FIG. 4A, the central axle 50 includes a central cone 51, a spring 52, and a headless screw bolt 53, all of which are sequentially mounted in the perforation 11 of the base 10. The front end of the central cone 51 is exposed through the perforation 11 of the base 10 for allowing the rotating disc 20 to be mounted thereon, and the flange located in the rear end of the central cone 51 contacted with the spring 52. The spring 52 provides the lift force to pop up the base 10 therethrough the central cone when it is released from compressed state. The headless screw bolt 53 beneath spring 52 is used to prop up spring 52 at this position. FIG. 2 shows an assembly side view of a rotatable fixture according to a preferred embodiment of the present invention. Referring to FIG. 1 and FIG. 2, at least four perforations 12 are disposed at locations away from the central axle 50 by an appropriate equal distance for embedding a rolling steel ball assembly 60 therein the base 10. As shown in FIG. 3B and FIG. 4B, the rolling steel ball assembly 60 includes a rolling steel ball 61, a rolling steel ball cushion 62, a spring 63, a spring cushion 64, and a headless screw bolt 65, all of which are sequentially disposed in the perforation 12. The spring 63 is clamped by the rolling steel ball cushion 62 and the spring cushion 64. The front end of the rolling steel ball cushion 62 with a cone surface props up the rolling steel ball 61 and the rear end of the spring cushion 64 is propped up by the headless screw bolt 65, the headless screw bolt 65 is used to plug the perforation 12 and as a foundation to prop up the spring cushion 64 at its position. In this manner, the rolling steel ball 61 is slightly exposed from the base 10. in this embodiment, four sets of rolling steel ball assembly are depicted to illustrate the possible configuration of the rolling steel ball assembly 60. However, the amount of the rolling steel ball assembly is not limited to the precise number disclosed herein.

The rotating disc 20 is also shaped as a plate and has a perforation 21 at its center. The perforation 21 corresponds to the central axle 50 for allowing the central axle 50 to pass therethrough and pivotally connect to the base 10. Thus, the rotating disc 20 can rotate with respect to the base 10. In order to make the rotation of the rotating disc 20 smooth, the elastic force of the spring 63 will be applied to the rolling steel ball 61 of the rolling steel ball assembly 60 during the rotation process, and thus the rotating disc 20 is slightly lifted and propped up by the rolling steel ball 61, such that the rotating disc 20 can be easily rotated by hand pushing with the relative rolling motion of the rolling steel ball 61.

Figure 5:
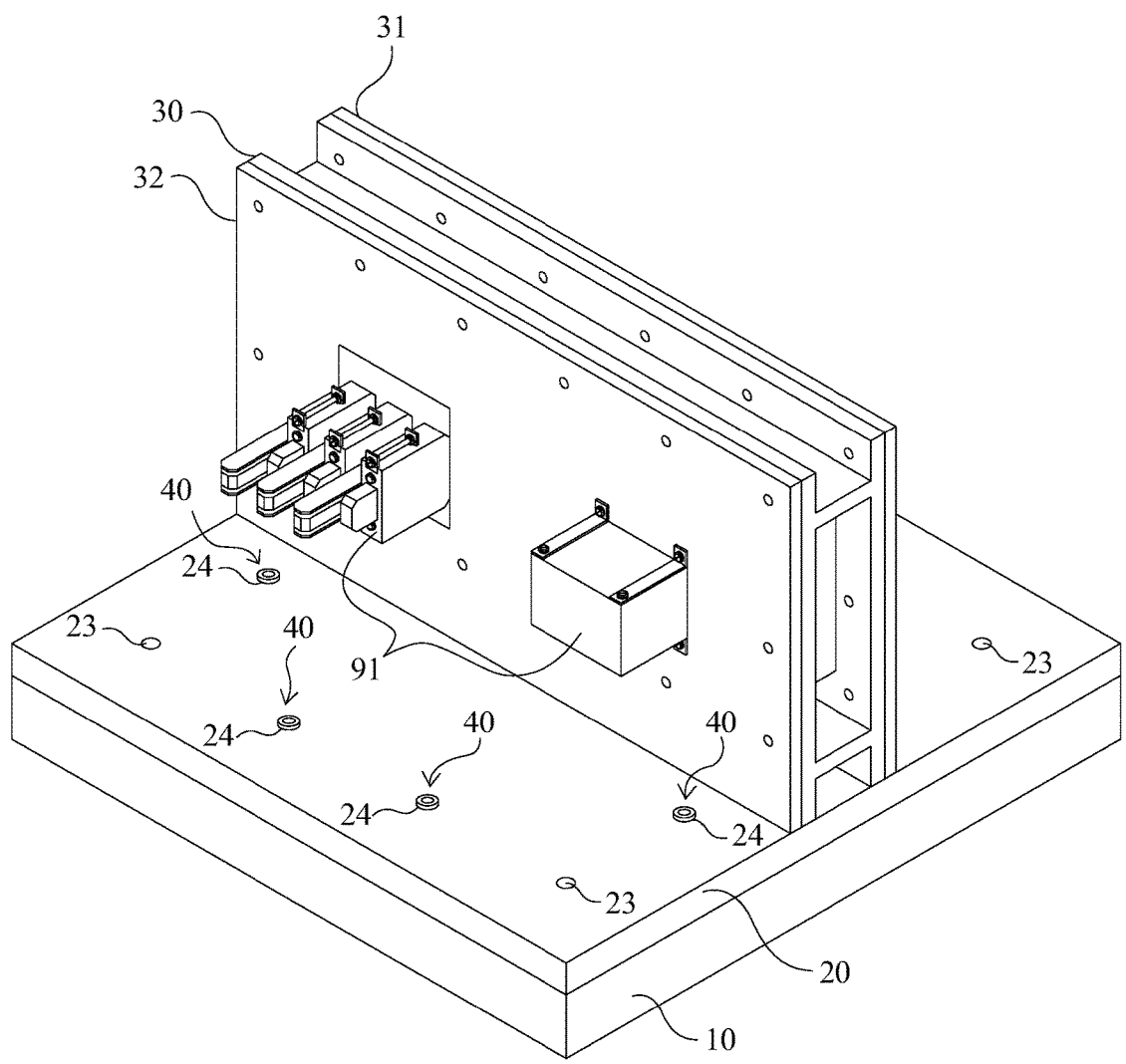
FIG. 5 exemplarily shows a diagram illustrating the use of a rotatable fixture according to a preferred embodiment of the present invention.
Figure 6A:
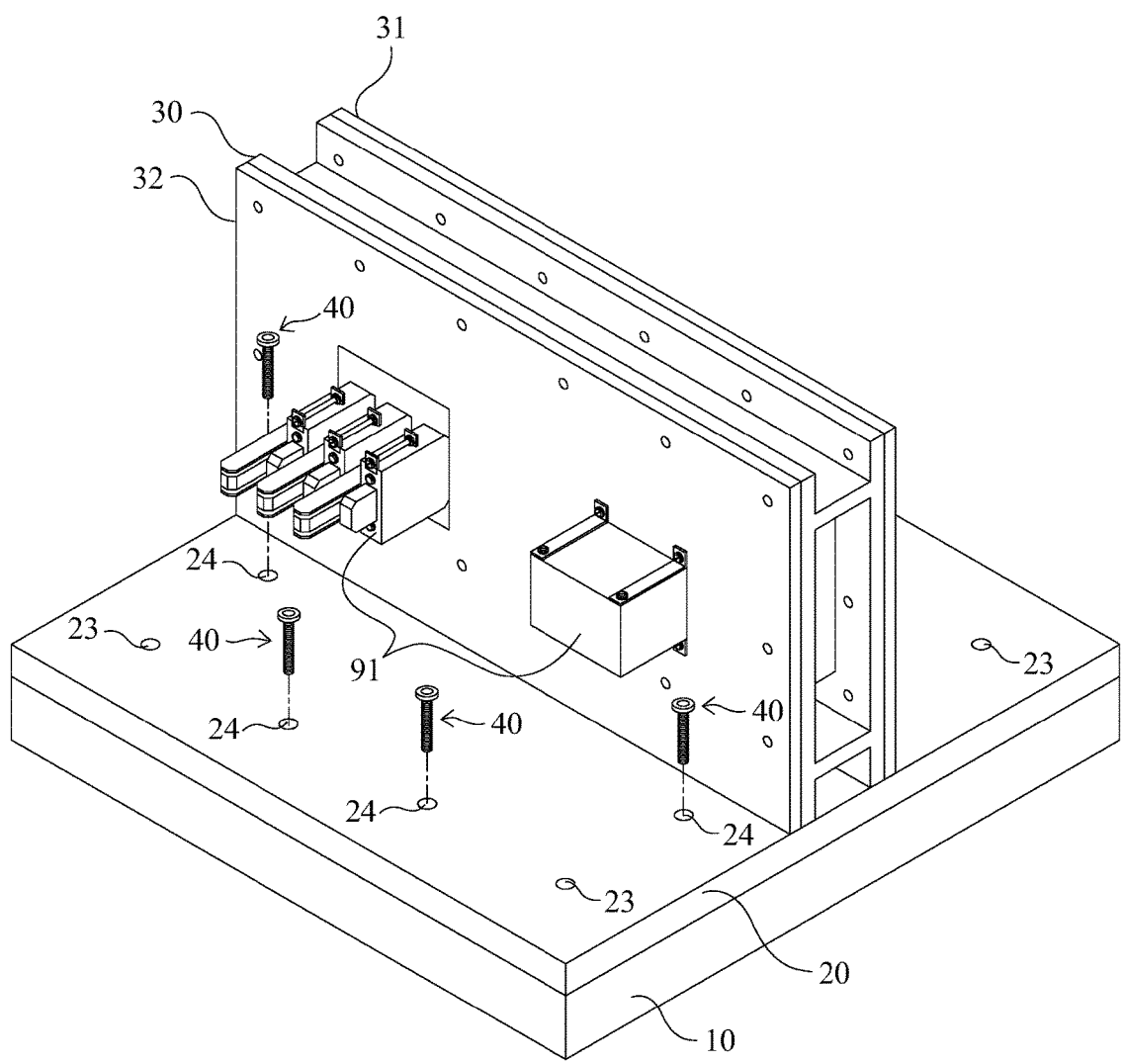
FIG. 6A and FIG. 6B show the diagrams of a rotatable fixture under the rotating state according to a preferred embodiment of the present invention.
Figure 6B:
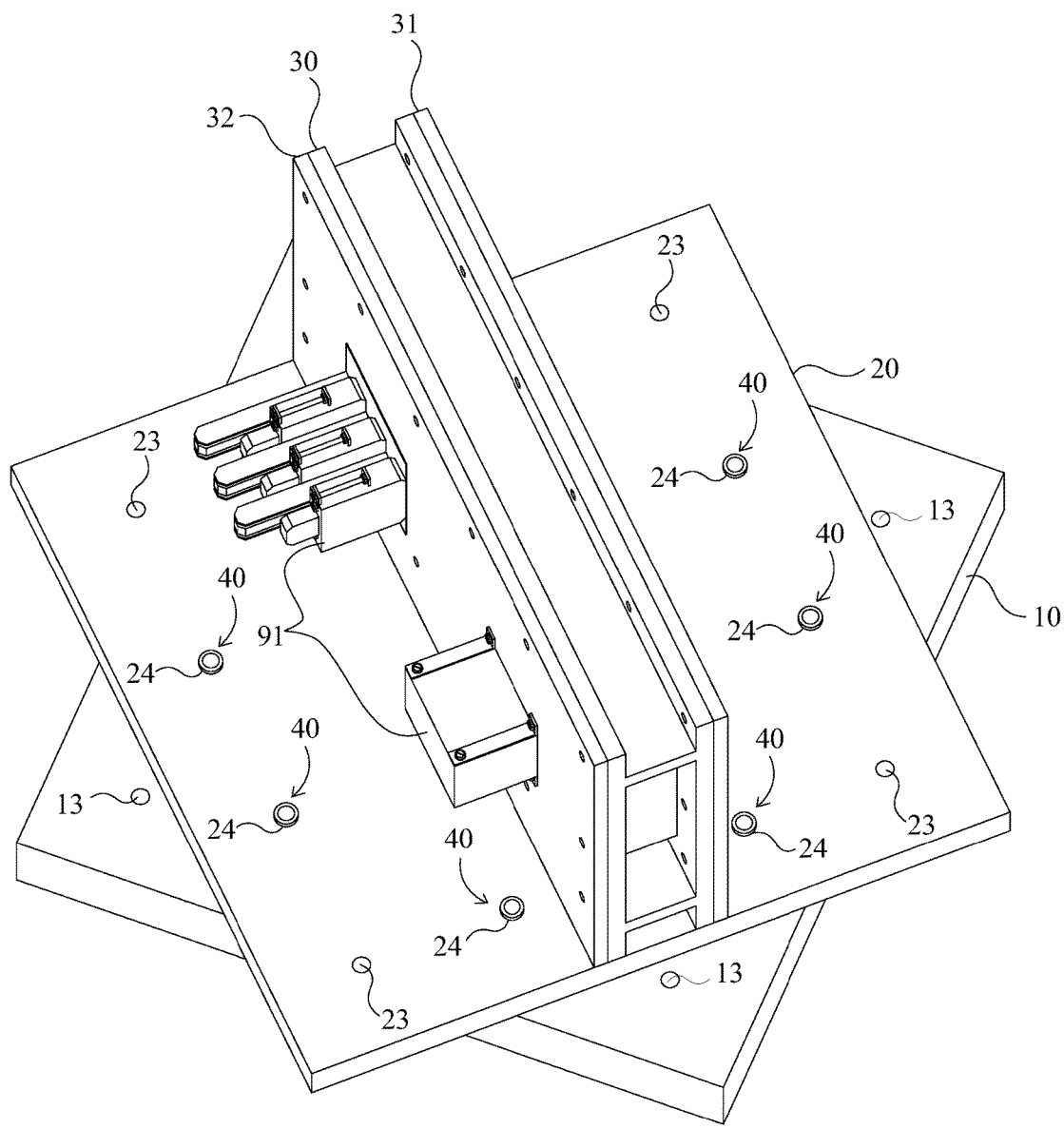

A fastening-member 40 is set to movably pass through the fastening hole 24 of the rotating disc 20 and the fastening hole 14 of the base 10, as shown in FIG. 5. The fastening member 40 is used to secure the rotating disc 20 and limit the rotation of the rotating disc 20 with respect to the base 10. When the fastening member 40 loosens the fastening of the rotating disc 20 with the base 10, as shown in FIG. 6A, the rotating disc 20 and the fastening frame 30 as well as the device 91 can be rotated together to an angle for the next test step (the angle for the next step may be, for example, 90 degree, as shown in FIG. 6B). Thus, the present invention can avoid the drawbacks that the conventional fixture has to be dismantled first and then rotate to a certain angle and secure to the test platform. As shown in the drawings, the fastening member 40 may be formed of a screw bolt. In addition, the fastening holes 14 and 24 may be used to mount lugs therein for allowing the rotatable fixture to be hanged thereby. On the other hand, the base 10 has a plurality of mounting holes 13, and the rotating disc 20 correspondingly has a plurality of mounting holes 23. The mounting holes 13 and 23 are untapped so as to secure the rotatable fixture to the test platform.

The fastening frame 30 is formed of a H-shaped steel plate, as shown in FIG. 1. Preferably, the H-shaped steel plate of the fastening frame 30 is configured as a hollow rectangle. The fastening frame 30 is set to be secured to the rotating disc 20 by way of, for example, welding, such that the basic natural frequency of the fixture is larger than 33 Hz. Taking a seismic test as an example, the major frequency band of a seismic wave is ranged between 1 to 33 Hz. Hence, resonance of fixture will not occur within the test frequency band, so as to ensure that the test result is free from distortion and not over tested.

The fastening frame 30 has a pair of fixing plates 31, 32 located at both sides of the fastening frame 30. The fixing plates 31 and 32 may be secured to the fastening frame 30 by screws. Also, the fixing plates 31 and 32 both include several lock holes 301 that are used for fixing the device under test. Hence, the rotatable fixture of the present invention is available to fasten with most kinds of device 91, regardless of its size. Typically, the device 91 under seismic test is a small-sized article weights less than 10 kilograms. Thus, the fixture of the present invention serves as a universal fixture and avoids the disadvantages encountered by the prior art that each device 91 requires a dedicated fixture for testing.

During the practical use, the device 91 is fastened to the fixing plate 31 or 32 of the fastening frame 30, as shown in FIG. 5. Afterwards, the device 91, the rotating disc 20, and the base 10 as well as the rest of the fixture are secured to test platform (not shown) of shake table through mounting holes 13 and 23 for testing. When it is desired to rotate the fixture during a test, the fastening member 40 can be removed to loosen the fastening between the base 10 and the rotating disc 20, as shown in FIG. 6A. Meanwhile, the rotating disc 20 is pivotally connected to the base 10 through the central axle 50, and the rotating disc 20 is propped up by the springs 52 and 63 on the base 10. In this way, the rotating disc 20 is slighted separated from the base 10, and the rolling steel ball 61 functions to provide bearing effect, so the rotating disc 20 can easily rotate to a desired agree (e.g. 90 degree), as shown in FIG. 6B. Afterwards, the fastening member 40 is secured to continue with the following test procedures.

Therefore, the rotatable fixture of the present invention is advantageous in terms of a simple structure, an easy assembling process, and excellent universalness. The present invention is particularly suitable for small-sized device under test with the weight being less than 10 kilograms. In addition, the natural frequency of the fixture is distant from the test frequency band by way of its special structural configuration. Also, the rotation of the rotating disc with respect to the base allows the fixture to rotate directly, without the need of being dismantled and re-installed. Thus, the rotatable fixture of the present invention can effectively shortened the time and cost for performing the test.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A rotatable fixture, comprising:
a base;
a rotating disc pivotally connected to the base through a central axle and capable of rotating with respect to the base;
a fastening frame uprightly fastened to the rotating disc for allowing a device under test to be securely fastened thereto; and
at least one fastening member movably passing through the rotating disc and the base for fastening the rotating disc and limiting a rotation of the rotating disc with respect to the base;
wherein the fastening frame includes a pair of fixing plates, the pair of fixing plates being secured to opposite surfaces of the fastening frame for allowing the device under test to be mounted thereon.

2. The rotatable fixture according to claim 1, wherein the central axle includes a central cone, a spring, and a headless screw bolt, all of which are sequentially mounted in a perforation which is located in the center of the base, the central cone being exposed through the perforation of the base for allowing the rotating disc to be mounted thereon.

3. The rotatable fixture according to claim 1, wherein the base is configured to provide support for the rotation of the rotating disc by at least four rolling steel ball assembly.

4. The rotatable fixture according to claim 3, wherein the rolling steel ball assembly includes a rolling steel ball, a rolling ball cushion, a spring, a spring cushion, and a headless screw bolt, all of which are sequentially superimposed in perforations of the base, such that the rolling steel balls are slightly exposed from their located perforations through the spring recoiling force when the rotating disc is rotating, thereby propping up the rotating disc.

5. The rotatable fixture according to claim 1, wherein each fixing plate includes a plurality of lock holes for fastening the device under test.

6. The rotatable fixture according to claim 1, wherein each fixing plate is secured to one side of the fastening frame by screws.

7. The rotatable fixture according to claim 1, wherein the fastening frame is formed of a H-shaped steel plate.

8. The rotatable fixture according to claim 7, wherein the H-shaped steel plate is configured as a hollow rectangle.

9. The rotatable fixture according to claim 1, wherein the fastening frame is set to be secured to the rotating disc, such that the basic natural frequency of the fixture is larger than 33 Hz.

* * * * *